June 9, 1964   J. R. KESSLER   3,136,499
AIRCRAFT POWER TRANSMISSION SYSTEM
Filed Nov. 15, 1962
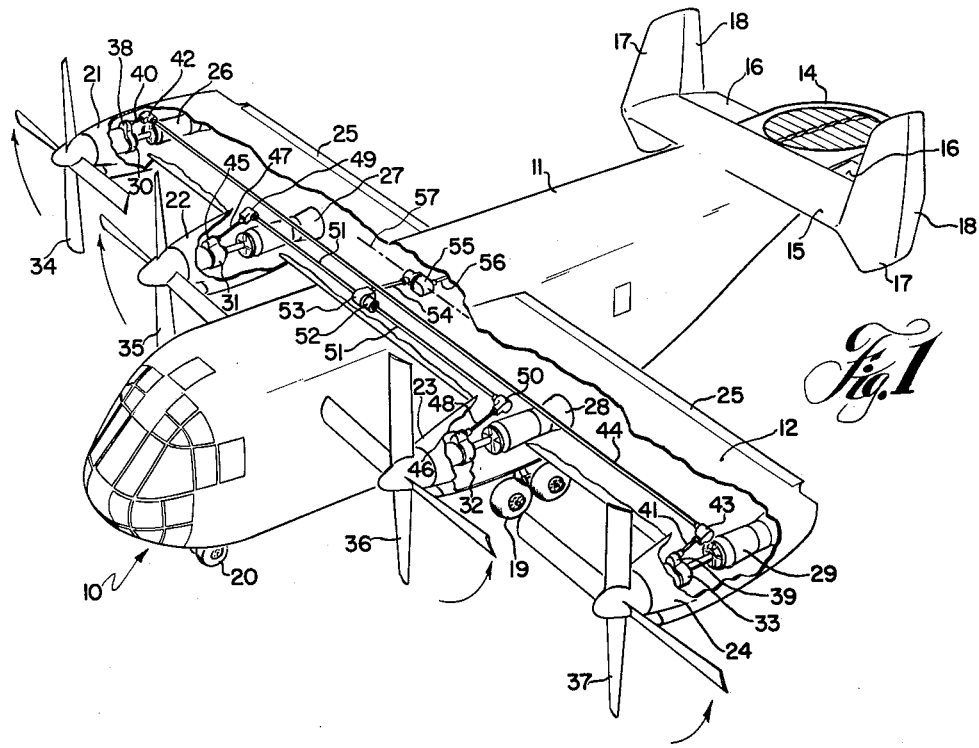
Fig. 1
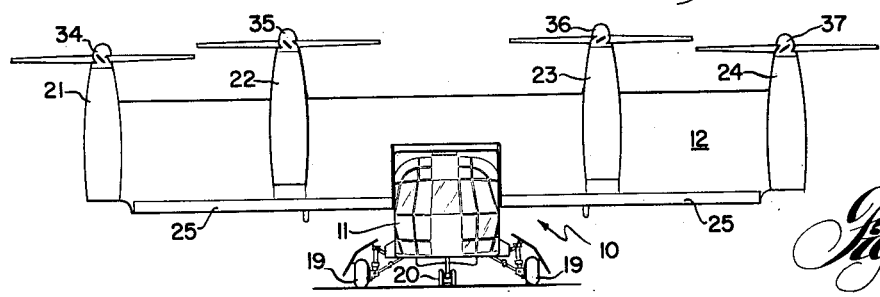
Fig. 2
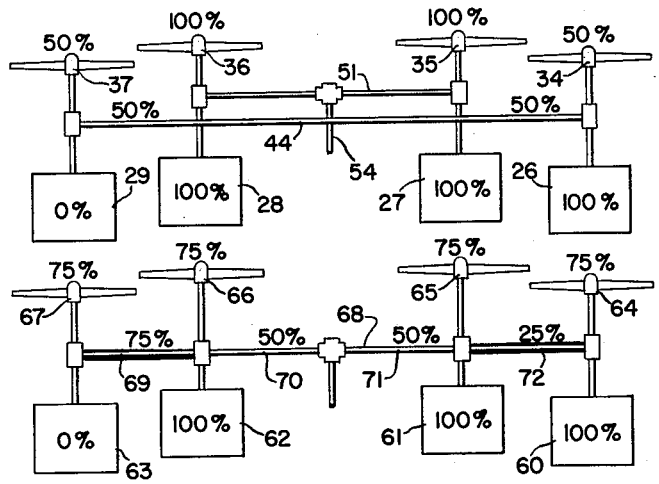
Fig. 3
Fig. 4
INVENTOR.
JAMES R. KESSLER
BY
ATTORNEY United States Patent Office 3,136,499
Patented June 9, 1964

3,136,499
AIRCRAFT POWER TRANSMISSION SYSTEM
James R. Kessler, Columbus, Ohio, assignor to
North American Aviation, Inc.
Filed Nov. 15, 1962, Ser. No. 237,856
8 Claims. (Cl. 244—7)

This invention relates generally to aircraft, and particularly concerns a transmission system which may be advantageously incorporated into the multi-engine power plant installation of an aircraft having capabilities for vertical or hovering flight and for conventional forward flight. Such aircraft are often referred to as multi-engine vertical take-off and landing (VTOL) type aircraft.

The invention described and claimed herein has particular application to a multi-engine VTOL-type air vehicle having a tilt-wing that is rotated between an essentially vertical position for vertical or hovering flight and an essentially horizontal position for conventional forward flight. Inboard engines and outboard engines are carried by the tilt-wing and each such engine drives a multi-blade, variable pitch propeller assembly. The invention particularly includes a novel arrangement of power transmission system components for interconnecting various engine and propeller assembly components to obtain improved aircraft operation. The inboard propellers associated with the inboard engines carried by the tilt-wing are connected to each other in equalized power loading relation at all times and through a first cross-shaft. Similarly, the outboard propeller assemblies are also interconnected to each other in equalized power loading relation at all times but by a second cross-shaft which is separate from the previously-mentioned first cross-shaft. The power transmission system permits operation of the inboard engines and inboard propeller assemblies independently of the outboard engines and outboard propeller assemblies and vice versa for effecting efficient cruise performance during conventional forward flight. As will be developed herein, other important advantages and significant weight savings may be realized from practice of the instant invention.

It is an important object of this invention to provide a tilt-wing VTOL-type aircraft having inboard engines and outboard engines which drive inboard propeller assemblies and outboard propeller assemblies, respectively, with means for separately equalizing the power loadings of the inboard propeller assemblies and of the outboard propeller assemblies at all times during operation of the aircraft to thereby avoid undesirable asymmetrical thrust loadings in the aircraft.

Another object of this invention is to provide a multi-engine tilt-wing VTOL-type aircraft with a power transmission system which interconnects various engine and propeller assembly components of the aircraft power plant installation to develop an emergency power transfer capability using lower emergency power transfer levels and included components of reduced weight.

Another object of this invention is to provide a tilt-wing VTOL-type aircraft with power plant installation which develops a level of reliability of operation corresponding to that of a dual power plant installation in conventional forward flight.

A still further object of this invention is to provide a multi-engine tilt-wing VTOL-type aircraft with a power plant installation that obtains highly reliable and highly efficient operation in forward conventional flight without requiring clutches or clutch-like devices in the installation.

Another object of this invention is to provide a multi-engine tilt-wing VTOL-type aircraft which permits high level propeller power loadings in all operating propeller assemblies to thereby produce an optimum level of cruise performance efficiency during conventional forward flight.

Other objects and advantages associated with this invention will become apparent during careful consideration of the description and drawings.

In the drawings:
FIG. 1 is a perspective view of a tilt-wing VTOL-type aircraft, with portions cut-away for clarity purposes, having the features of a preferred embodiment of my invention incorporated therein;
FIG. 2 is a front elevational view of the aircraft illustrated in FIG. 1 showing the tilt-wing component of the aircraft in position for vertical or hovering flight;
FIG. 3 is a block diagram showing the power transfer relation which exists with the power transmission system of this invention in situations wherein an engine-out situation exists during power plant installation operation; and
FIG. 4 is a block diagram showing the power transfer relation which exists in a conventional single cross-shaft type of power transmission system for a comparable aircraft and in an engine-out situation similar to the situation referenced in FIG. 3.

A VTOL-type aircraft incorporating the features of this invention is referenced generally as 10 in the drawings. Such aircraft includes a fuselage portion 11 and a tilt-wing 12 carried by and rotatably joined to the fuselage. The empennage portion of aircraft 10 includes louvered and shrouded pitch fan 14 for developing lift and pitch control during vertical and hovering flight conditions. Pitch fan 14 remains inoperative during conventional forward flight of aircraft 10. The empennage also includes a horizontal stabilizer 15, elevators 16, vertical stabilizers 17, and rudders 18. Components 15 through 18 are provided primarily for obtaining pitch and directional control of aircraft attitude during conventional forward flight. Aircraft 10 also is provided with a main landing gear 19 and with the nose landing gear designated 20.

Tilt-wing 12 is provided with the attached pod-type nacelles designated 21 through 24 and with the full-span flaps designated 25. Nacelles 21 through 24 are provided primarily to contain the engine portions of the aircraft power plant system. Flaps 25 are provided primarily to develop added lift during aircraft transition flight operations; flaps 25 are also used to obtain lateral control of aircraft attitude during conventional forward flight and directional control of the aircraft during vertical or hovering flight. Tilt-wing 12 is shown in its forward flight position in FIG. 1. The position of tilt-wing 12 for vertical or hovering flight is shown in FIG. 2 and is essentially a true vertical position. An actuating means (not shown) is also provided in the airplane for rotating tilt-wing 12 between its forward flight and vertical or hovering flight positions.

Nacelles 21 through 24 house engines 26 through 29, main speed reduction gear boxes 30 through 33, and portions of propeller assemblies 34 through 37, respectively. In a preferred version of an aircraft incorporating the instant invention, engines 26 through 29 are turbo-shaft engines having the conventional designation T64GE-6. Each such engine is provided with an axial-flow compressor section having variable stators, with an annular combustion chamber section, with an axial-flow, two-stage gas generator turbine section, and with an axial-flow, two-stage, free-power turbine section. The gas generator turbine section serves to drive the engine compressor section; the independent free-turbine section functions to drive the associated propeller assembly through an interconnected engine drive shaft. Such engines have a military power rating of 2,690 shaft H.P. at a nominal speed of 13,600 r.p.m. Thus, it becomes evident that a speed reduction subsystem may be required to reduce the engine output to a level suitable for propeller assembly operation.

In aircraft 10 speed reduction is accomplished through the use of speed reduction gear boxes 30 through 33 and speed reducer components made integral with propeller assemblies 34 through 37. Gear boxes 30 through 33 may utilize a two-step gear train or planetary with a reduction ratio of 3.10:1. Such gear boxes are mounted as a part of engine installations 26 through 29, respectively. Secondary speed reduction obtained in integral portions of propeller assemblies 34 through 37 may utilize a reduction ratio of about 4.8:1. Thus, a nominal engine speed of 13,600 r.p.m. may be effectively reduced to 1,050 r.p.m. at propeller assemblies 34 through 37. Assuming that engines 26 through 29 are operated to rotate their drive shaft components in like directions, reverse gearing components may be incorporated into speed reduction units 32 and 33 or 30 and 31 to obtain the directions or propeller assembly rotation shown in FIG. 1.

Each of propeller assemblies 34 through 37 is illustrated as having four separate propeller blades. Such blades are, as suggested above, assembled integral with the secondary speed reduction gear boxes or planetary system. The blades of the various propeller assemblies are provided with blade angle control through a dual hydraulic servo system (not shown) for collective pitch angle control during flight.

Heretofore, it has been conventional practice to interconnect the various engine-propeller assemblies of a multi-engine tilt-wing VTOL-type aircraft with a single cross-shaft type of power transmission system to obtain proper power equalization and emergency power transfer. Such conventional cross-shaft systems require that a clutch or clutch-like device be used between each engine and the propeller cross-shaft power transmission system, and that such clutches be selectively operated to obtain efficient power system utilization during forward flight cruise conditions or to obtain effective de-clutching of a malfunctioning engine. An engine failure may be caused by fuel leakage, fire, lubrication failure, excessive vibration, overheating, and the like; such failures generally require complete engine shut-down to prevent system deterioration or destruction. In comparison to the instant invention, use of the conventional single cross-shaft subsystem for interconnecting particular engines to the propeller assemblies in an engine-out situation imposes weight penalties based upon both weight of included shafting required for higher emergency power transfer loadings and the weight of clutch devices for obtaining optimum cruise performance. The disadvantages of the conventional arrangement may be overcome through incorporation of a power transmission system in an aircraft as follows.

Outboard engine-propeller assemblies 26, 34 and 29, 37 are provided with angle take-off drives 38 and 39, respectively. Such take-off drives are essentially beveled gear devices that are in turn coupled to the angle drive shafts designated 40 and 41. Angle drive shafts 40 and 41 are each connected to right angle gear boxes 42 and 43, respectively. Gear boxes 42 and 43 are operably connected to each other by the unitary cross-shaft designated 44. Although not shown, shaft 44 may include fixed flexible couplings to accommodate wing deflection during flight and is supported by suitable pillow block bearings. No clutch devices are provided in the arrangement of components which interconnects engine-propeller assemblies 26, 34 and 29, 37. The primary purpose of the shaft interconnection is to provide for power equalization at all times and particularly in the event either engine 26 or engine 29 experiences a condition of emergency operation during aircraft flight. In such situations each associated propeller assembly would nominally operate at 50% power output; one engine, operating at 100% output, would drive both associated propeller assemblies. At other times shafting 44 transfers no power, or transfers approximately half the power output differential between the associated operating engines.

Inboard engine-propeller assemblies 27, 35 and 28, 36 are interconnected entirely independently of the outboard portions of the aircraft power plant installation. Each such assembly is provided with an angle take-off drive designated 45 or 46 in FIG. 1. Such take-off drives are, as in the case of take-off drives 38 and 39 essentially beveled gear units. Angle drive shafts 47 and 48 are connected to take-off drives 45 and 46 and also are connected to the right-angle gear boxes designated 49 and 50, respectively. Such angle gear boxes are coupled to each other by the single unitary cross-shaft designated 51. The primary purpose of the shaft interconnection is to provide for power equalization at all times and particularly in the event either engine 27 or engine 28 should experience a condition requiring shut-down during aircraft flight. In an engine-out situation each associated propeller assembly would operate at a nominal 50% power output; one engine, operating at 100% output, would drive both associated propeller assemblies. At other times shafting 51 transfers no power or transfers approximately half the power output differential between the associated operating engines.

Certain additional components are included in aircraft 10 to develop a power take-off for pitch control fan 14. Such additional components include a clutch 52 and a T-gear box designated 53. The gear elements in unit 53 are driven by shaft 51 during selective operation of clutch 52. A shaft 54 connects T-gear box 53 to the hinge-line double-angle gear box designated 55. Shaft 56 extends from gear box 55 to pitch control fan 14. It should be noted that the pivot axis of double-angle gear box 55 coincides with the rotational axis 57 of tilt-wing 12. Thus, wing rotation may be effected during transition between vertical and forward flight conditions without loss of power to pitch control fan 14.

During aircraft operation, cross-shafts 44 and 51 preferably operate at about 4,400 r.p.m. No speed reduction need be accomplished in either the take-off drives or right-angle gear boxes previously-discussed herein. If necessary, features permitting folding of outboard portions of tilt-wing 12 may be readily incorporated into the power transmission system using conventional details.

The power plant installations of aircraft 10 is conventional to the extent that engines 26 through 29 may each be operated independently of each other engine. Thus, engines 26 and 29 may be operated together to obtain maximum cruise performance efficiency or engines 27 and 28 may be operated together to obtain maximum cruise performance efficiency, as desired, by aircraft operating personnel. In either such manner of operation the improved aircraft efficiency is realized essentially through the achieved heavier power loadings of the directly driven propeller assemblies (34 and 37 or 35 and 36).

As previously-mentioned, significant weight savings are realized in the instant invention by the complete elimination of clutch devices between particular engines and the cross-shaft power transmission system. In cruise flight situations it is possible to utilize either engines 26 and 29 (and attendant propeller assemblies) or engines 27 and 28 (and attendant propeller assemblies) to develop the required propulsion thrusts without having to de-clutch other engines from the aircraft power plant installation. In the case of a single cross-shaft transmission system which couples multiple engines of a comparable power plant installation, one or more particular engines must be de-clutched to attempt optimum aircraft operation for forward flight cruise.

In addition, and because of the emergency power transfer relation which exists in the power transmission system of this invention in situations where one or more engines experience an operating condition requiring engine shut-down, less weight is required for the necessary interconnecting cross-shaft elements. In the FIG. 3 schematic illustration, engine 29 is considered inoperative. The power output of engine 26 is, through take-off drives 38 and 39, angle drive shafts 40 and 41, gear boxes 42 and 43, and cross-shaft 44, utilized in part to drive propeller assembly 37. As shown in FIG. 3, approximately 50% of the power developed by engine 26 is transferred by means of cross-shaft 44 to propeller assembly 37. The 50% level is basically a maximum power transfer load level for the entire cross-shaft.

In the FIG. 4 illustration, a single cross-shaft is illustrated for transferring power as between the engines designated 60 through 63 and the propeller assemblies designated 64 through 67. The cross-shaft is designated 68 and for analytical reasons is considered in terms of separate portions designated 69 through 72. In an engine-out situation comparable to the FIG. 3 condition, remaining operative engines 60 through 62 are utilized to drive all the propeller assemblies and do so on a basis of sharing the total power output. Each of propeller assemblies 64 through 67 is operated at a 75% power output level. In transferring portions of individual engine power outputs to propeller assembly 67, portion 69 of cross-shaft 68 transmits power at approximately a 75% power (of one engine) level. This is significantly higher than the 50% level identified in connection with the arrangement of FIG. 3 and requires an increased materials weight in portions of the power transfer system. Similarly, for cases wherein engine 60 might become inoperative, portion 72 of cross-shaft 68 must also transfer power at a corresponding 75% level. This possible manner of operation also requires that more materials be provided in the cross-shaft (section 72) to accommodate the higher power transfer loading level. By similar analysis, cross-shaft portions 70 and 71 must be designed to accommodate a transfer loading equivalent to 100% of the output power of one engine for situations wherein either engines 60 and 61 or engines 62 and 63 only are simultaneously operated.

In all modes of operation of the aircraft system of this invention involve power equalization as between propeller assemblies paired by the various cross-shaft components and related elements at all times of operation, this being so even though the associated engines have different power outputs. Another advantage of this invention resides in improved dependability of the system, particularly as to optimum efficiency in conventional forward flight. In a single cross-shaft power transmission system, failure of the cross-shaft results in incapacitation of the complete power system for achieving optimum cruise efficiency. With my invention, failure of one cross-shaft does not affect the other engine-propeller assembly pairing and does not at all eliminate the capability of obtaining maximum cruise performance efficiency.

It is to be understood that the forms of the invention herewith shown and described are to be taken as preferred embodiments of the same, but that various changes in the proportioning, size, and detail of parts may be resorted to without departing from the spirit of the invention or the scope of the subjoined claims.

I claim:

1. In a VTOL-type airplane, in combination: a fuselage, a tilt-wing carried by said fuselage, inboard engines carried by said tilt-wing at opposite sides of said fuselage and each having a free-turbine power output section, outboard engines carried by said tilt-wing at opposite sides of said fuselage and each having a free-turbine power output section, inboard propeller assemblies respectively connected to said inboard engine free-turbine power output sections, outboard propeller assemblies respectively connected to said outboard engine free-turbine power output sections, a first power transfer means connecting said inboard propeller assemblies to each other, and a second power transfer means connecting said outboard propeller assemblies to each other, each of said power transfer means functioning entirely independently of the other of said power transfer means, and each of said power transfer means being capable of transferring a maximum of one-half the maximum possible difference between the output powers of the respective engine output sections connected thereto between the propeller assemblies connected thereto.

2. The invention defined by claim 1, wherein said inboard propeller assemblies are connected to each other in non-disengageable relation by said first power transfer means, and wherein said outboard propeller assemblies are connected to each other in non-disengageable relation by said second power transfer means.

3. In a VTOL-type airplane, in combination: a wing having right and left portions, an inboard engine carried by each of said wing portions, an outboard engine carried by each of said wing portions, inboard propellers and outboard propellers which are respectively connected to said engines, a first power transmission shaft located within said wing and coupling said inboard propellers and connected engines to each other, and a second power transmission shaft located within said wing and coupling said outboard propellers and connected engines to each other, said first and second power transmission shafts each being capable of transferring a maximum of one-half the maximum possible power differential which exists as between the output powers of said inboard engines and which exists as between the output powers of said outboard engines, respectively.

4. The invention defined by claim 3, wherein said inboard propellers and outboard propellers respectively connected to said engines are connected to said engines in non-disengageable relation.

5. The invention defined by claim 3, wherein said inboard propellers are connected to each other in non-disengageable relation by said first power transmission shaft, and wherein said outboard propellers are connected to each other in non-disengageable relation by said second power transmission shaft.

6. In a VTOL-type airplane, in combination: inboard engines each having an output shaft, outboard engines each having an output shaft, propeller assemblies connected to each of said engine output shafts, a first shaft and gear box means coupling said inboard engine output shafts to each other, and a second shaft and gear box means coupling said outboard engine output shafts to each other, said second shaft and gear box means functioning entirely independently of said first shaft and gear box means at all times, and said first shaft and gear box means and said second shaft and gear box means each being capable of transferring a maximum of one-half the maximum possible difference between the output powers of the output shafts connected thereto, respectively.

7. The invention defined by claim 6, wherein said propeller assemblies are each connected to an engine output shaft in non-disengageable relation.

8. The invention defined by claim 6, wherein said inboard engine output shafts are connected to each other in non-disengageable relation by said first shaft and gear box means, and wherein said outboard engine output shafts are connected to each other in non-disengageable relation by said second shaft and gear box means.

References Cited in the file of this patent

UNITED STATES PATENTS

| | | |
|---|---|---|
| 1,124,652 | Pflaging | Jan. 12, 1915 |
| 2,708,081 | Dobson | May 10, 1955 |
| 2,936,968 | Mazzitelli | May 17, 1960 |
| 2,973,167 | Lake | Feb. 18, 1961 |
| 3,038,683 | Rowe | June 12, 1962 |
| 3,073,547 | Fischer | Jan. 15, 1963 |

FOREIGN PATENTS

| | | |
|---|---|---|
| 336,927 | Germany | May 19, 1921 |
| 538,046 | Great Britain | July 17, 1941 |